US010823817B2

(12) United States Patent
Stevens

(10) Patent No.: US 10,823,817 B2
(45) Date of Patent: Nov. 3, 2020

(54) DEMULTIPLEXING METHOD AND DEVICE

(71) Applicant: KATHOLIEKE UNIVERSITEIT LEUVEN, Leuven (BE)

(72) Inventor: Nobby Stevens, Sint-Maria-Oudenhove (BE)

(73) Assignee: KATHOLIEKE UNIVERSITEIT LEUVEN, Leuven (BE)

( * ) Notice: Subject to any disclaimer, the term of this patent is extended or adjusted under 35 U.S.C. 154(b) by 261 days.

(21) Appl. No.: 15/571,616

(22) PCT Filed: May 6, 2016

(86) PCT No.: PCT/EP2016/060153
§ 371 (c)(1),
(2) Date: Nov. 3, 2017

(87) PCT Pub. No.: WO2016/177867
PCT Pub. Date: Nov. 10, 2016

(65) Prior Publication Data
US 2018/0143291 A1 May 24, 2018

Related U.S. Application Data

(60) Provisional application No. 62/241,001, filed on Oct. 13, 2015, provisional application No. 62/240,998, filed on Oct. 13, 2015.

(30) Foreign Application Priority Data

May 5, 2015 (GB) .................................. 1507632.6
Jun. 19, 2015 (GB) .................................. 1510774.1

(51) Int. Cl.
*G01S 5/16* (2006.01)
*H04B 10/116* (2013.01)
(Continued)

(52) U.S. Cl.
CPC .................. *G01S 5/16* (2013.01); *G01S 5/02* (2013.01); *H04B 10/116* (2013.01); *H04B 10/502* (2013.01); *G01C 3/08* (2013.01)

(58) Field of Classification Search
CPC ....... H04B 10/116; H04B 10/502; G01S 5/16; G01S 5/02; G01C 3/08
(Continued)

(56) References Cited

U.S. PATENT DOCUMENTS 3,575,665 A 4/1971 Honma
2014/0280316 A1 9/2014 Ganick et al.
2015/0094946 A1 4/2015 Lai

FOREIGN PATENT DOCUMENTS

CN 104181503 A 12/2014
WO 2011102662 A2 8/2011

OTHER PUBLICATIONS

Great Britain Search Report from GB Application No. GB1507632.6, dated Oct. 18, 2015.
(Continued)

*Primary Examiner* — Daniel L Murphy
(74) *Attorney, Agent, or Firm* — Workman Nydegger

(57) ABSTRACT

A method is disclosed for demultiplexing a signal. The method comprises receiving the signal being a sum of at least two sub-signals, whereby each sub-signal comprises a different repetitive pattern. The method also comprises sampling the signal during a time period, whereby the time period is such that the different repetitive patterns of each sub-signal occur at least once and whereby at least sub-signals are periodic during with a different specific frequency. The method further comprises periodically expanding the signal in a Fourier series and obtaining the different complex spectral components of the periodically expanded signal.

11 Claims, 7 Drawing Sheets

(51) Int. Cl.
   *H04B 10/50*   (2013.01)
   *G01S 5/02*    (2010.01)
   *G01C 3/08*    (2006.01)

(58) Field of Classification Search
   USPC ........................................................ 356/5.01
   See application file for complete search history.

(56) References Cited

OTHER PUBLICATIONS

Great Britain Search Report from GB Application No. GB1510774. 1, dated Oct. 18, 2015.

International Search Report from PCT Application No. PCT/EP2016/060153, dated Jul. 19, 2016.

Lausnay et al., "A Visible Light Positioning System Using Frequency Division Multiple Access With Square Waves," IEEE, 9th International Conference on Signal Processing and Communication Systems, Dec. 2015, 7 Pages.

Liqun et al., "Epsilon: A Visible Light Based Positioning System," 11th USENIX Symposium on Networked Systems Design and Implementation (NSDI '14), Apr. 2-4, 2014, pp. 331-343.

DEMULTIPLEXING METHOD AND DEVICE

FIELD OF THE INVENTION

The present invention relates to a demultiplexing method and device, in particular a method and device for demultiplexing signals, wherein the signals are a sum of at least two sub-signals, wherein each sub-signal comprises a different specific frequency. In further embodiments the present invention relates to a demultiplexing method and device for non-synchronized power switched keyed intensity sources.

BACKGROUND OF THE INVENTION

The problem of accurate indoor positioning is still an open challenge. For outdoor environments, the well-known Global Positioning System (GPS) is providing the solution. Indoors however, GPS does not deliver the desired sub-meter or even centimeter accuracy due to fading effects. For indoor environments, an accurate, wireless technology can enable location-based services (LBS). These services are e.g., indoor navigation, content delivery based on the position of the mobile node, heat mapping, path optimization, . . . . Numerous research efforts have been executed to determine the indoor position of a mobile receiver based on radio-frequency (RF) signals. With the increased application of light emitting diodes (LEDs), an alternative solution can be studied, the solution being the usage of LEDs as an enabling technology for indoor location-based services. The success of the solution will depend on the easiness of integration with existing infrastructure. Nowadays, LEDs are used for illumination purposes. It is clear that the solution for indoor localization may not compromise this illumination function. The LEDs are, in general, not part of a communication network, with the consequence that there is no synchronization possible between the LEDs with the contemporary topology. Often, LEDs are dimmed using power switching, at a frequency that is significantly above the flicker threshold. So, the power switching capability is available at most drivers.

U.S. Pat. No. 3,575,665 discloses an asynchronous demodulation system for pulse position modulation signal utilizing phase or frequency modulated higher harmonic of a sampling frequency. In U.S. Pat. No. 3,575,665 the higher harmonics are used to filter out the false pulses, consequently it does not provide a demultiplexing method and/or device.

Therefore, there is a need for a novel approach and device for demultiplexing.

SUMMARY OF THE INVENTION

It is an object of the present invention to provide a good system and method for demultiplexing signals.

It is an advantage of embodiments of the present invention to provide a good system and method for demultiplexing rectangular shaped signals from non-synchronized sources. More specifically it provides good systems and methods for demultiplexing signals from non-synchronized power switched intensity sources.

It is an advantage of embodiments of the present invention that use can be made of unsynchronized low bandwidth transmitters, leading to an easy implementation using for example current high efficiency LED drivers.

The object is met by the method and apparatus according to the independent claims of the present invention. The dependent claims relate to preferred embodiments.

It is an advantage of embodiments of the present invention that the delays between the intensity sources is random, i.e. which meets the condition of non-communicating sources. Each intensity source is assigned a specific frequency during the installation of the infrastructure and broadcasts continuously an on/off signal with a periodicity corresponding to its assigned frequency. The position of each LED with its own frequency within the building is stored on a map and available at the mobile node. The dimming level of the LEDs is equal and known at the receiving node.

It is an advantage of embodiments of the present invention that a good accuracy can be obtained. In some embodiments, position errors smaller than 10 cm can be achieved, for example smaller than a few centimeter such as for example smaller than 5 cm. The latter is sufficient for most applications. Furthermore, it is to be noticed that even higher accuracy can be obtained, for example by increasing the number of sampling points or by using more accurate, but typically also more expensive, components in the system, such as for example the detector used for detecting the complex signal.

It is an advantage of at least some embodiments that the radiation sources used can transmit pilot tones in a non-synchronized way to the receiver and that no backbone network between the radiation sources is required.

It is an advantage of at least some embodiments of the present invention that only a single detection, e.g. photodiode, is used as a receiver. Such embodiments provide a solution for the fact that spatial division multiple access (SDMA) cannot be applied when using a single detector.

It is an advantage of at least some embodiments, that no dedicated LED driver is required where for example an analog signal is imposed on top of a DC driving signal. It also advantageous that, when avoiding such dedicated LED drivers, it is also avoided that the LED current is not monitored and that the LED color grading perspective is not guaranteed. Furthermore, embodiments of the present invention advantageously have a relatively short installation time and installation cost, since there is no need for a backbone network between the radiation sources, e.g. LEDs, for synchronization.

It is an advantage of at least some embodiments that easy adaptation of a Visible Light Positioning system in existing lighting applications can be obtained, since there is no need for a backbone network and the radiation sources can send their information asynchronous to the object to be positioned.

In a first aspect the present invention provides methods for demultiplexing a signal ($r_{tot}(t)$), wherein said method comprises following steps:

receiving said signal ($r_{tot}(t)$) is a sum of at least two sub-signals ($r_1(t)$, $r_2(t)$, . . . ), wherein each sub-signal comprises a different repetitive pattern, sampling the signal ($r_{tot}(t)$) during a time period ($T_{obs}$), wherein the time period ($T_{obs}$) is such that the different repetitive patterns of each sub-signal occur at least once and wherein at least (s−1) sub-signals are periodic during $T_{obs}$ with a different specific frequency $f_s=s \cdot (1/T_{obs})$, wherein s is an integer ≥1;

periodically expanding the signal ($r_{tot}(t)$) in a Fourier series and obtaining the different complex spectral components of the periodically expanded signal ($r_{Ptot}(t)$).

In preferred embodiments the signal ($r_{tot}(t)$) is received at a receiving end, and said signal comprises at least two sub-signals provided by at least two sources. The method further comprises determining the position of the receiving end based on the different complex spectral components of the received signal. In some embodiments, said signals comprise at least three sub-signals provided by at least three sources. The latter may be advantageous e.g. when the algorithm is performed for position localization. For Received Signal Strength (RSS) position determination for example, typically at least three sub-signals will be required. The algorithm nevertheless is not restricted to using at least three sub-signals and use of two sub-signals also can be applied for other applications.

In preferred embodiments the sub-signal is a rectangular shaped signal.

In further preferred embodiments the at least two sub-signals are provided by at least two non-communicating sources.

In other preferred embodiments the phase delay of the at least two sub-signals is random.

In another aspect the present invention provides demultiplexing devices adapted to receive a signal ($r_{tot}(t)$), wherein said signal ($r_{tot}(t)$) is a sum of at least two sub-signals (($r_1(t)$, $r_2(t)$, ...), and wherein said device is adapted to demultiplex the signal ($r_{tot}(t)$) in at least two sub-signals (($r_1(t)$, $r_2(t)$, ...) according to methods of embodiments of the present invention. It is an advantage of embodiments of the present invention that a method is provided to demultiplex several intensity power switched signals at a receiver with an unknown position. The received intensity level of an individual source relates to the distance of that source. When the static position of a least three sources is available, a minimization procedure allows accurate positioning of the mobile receiver. However when embodiments of the present invention are used for positioning purposes at least three sources providing at least three sub-signals are required.

The present invention also relates to a method for determining a position of an object based on visible light from different light sources, the method comprising detecting, on the object for which a position is to be determined, a signal representative for the different contributions of the different light sources, demultiplexing the signal using a method as described above for obtaining the different contributions of the different radiation sources, and deriving, based on the determined different contributions of the different radiation sources, a position of the object.

The present invention furthermore relates to a position determining system for determining a position of an object based on visible light from different light sources, the system comprising a demultiplexing device for demultiplexing a signal as described above and a position deriving means for deriving a position based on the determined different contributions of the different radiation sources as obtained from the demultiplexing system.

The position determining system may comprise a light source driver for driving the different light sources each at a specific predetermined frequency. The positioning system furthermore may comprise a plurality of different light sources being driven by the light source driver.

The present invention also relates to a computer program product for, when executing on a computing device, executing a method for demultiplexing a signal ($r_{tot}(t)$) as described above.

It further relates to a data carrier medium comprising such a computer program product and transmission of a computer program product over a wide or local area network.

Particular and preferred aspects of the invention are set out in the accompanying independent and dependent claims. Features from the dependent claims may be combined with features of the independent claims and with features of other dependent claims as appropriate and not merely as explicitly set out in the claims.

BRIEF DESCRIPTION OF THE DRAWINGS

Further features of the present invention will become apparent from the examples and figures, wherein.

DETAILED DESCRIPTION OF PREFERRED EMBODIMENTS

Figure 1:
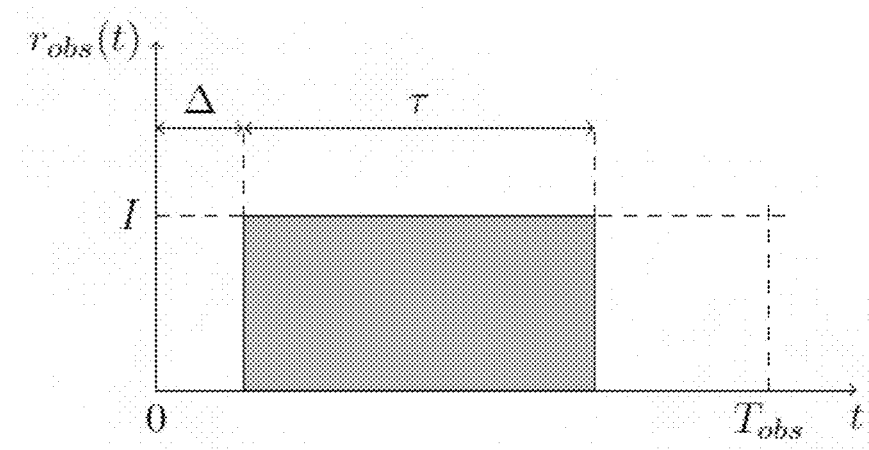
FIG. 1 illustrates an observed sub-signal ($r_{obs}(t)$) with intensity $I_1$ during an observation time $T_{obs}$ from a single intensity source as known in the art. Remark that in this example, $r_{obs}(t)=r_1(t)$, and thus s=1. The dimensionless duty cycle $\delta$ (equals $\tau/T_{obs}$) is larger than 0.5 in this illustration.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated. The term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B. Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein. Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein. In the drawings, like reference numerals indicate like features; and, a reference numeral appearing in more than one figure refers to the same element. The drawings and the following detailed descriptions show specific embodiments of devices and methods for demultiplexing.

The term "rectangular shaped signal" used in this text relates to wave signals, which may be a non-sinusoidal periodic waveform (which for instance can be represented as an infinite summation of sinusoidal waves), in which the amplitude alternates at a steady frequency between fixed minimum and maximum values, where the duration of the minimum and maximum determines the duty cycle. The transition between minimum to maximum is preferably instantaneous, for instance for an ideal square wave. The rectangular shaped signal also may be referred to as a block wave signal.

The term "non-synchronized or non-synchronization" used in this text relates to sources which provide signals, referred to as sub-signals, which are delayed in time with respect to each other, wherein the delay is not a predetermined but a random number.

The term "demultiplexing" used in this text relates to extracting the signal received at the receiver end into the sub-signals contributions, wherein the signal is a sum of these sub-signals.

In a first aspect, the present invention relates to a method for demultiplexing a signal ($r_{tot}(t)$). The method comprises receiving said signal ($r_{tot}(t)$) being a sum of at least two sub-signals ($r_1(t)$, $r_2(t)$, ... ). Each sub-signal comprises a different repetitive pattern. The method also comprises sampling the signal ($r_{tot}(t)$) during a time period ($T_{obs}$), wherein the time period ($T_{obs}$) is such that the different repetitive patterns of each sub-signal occur at least once and wherein at least (s−1) sub-signals are periodic during $T_{obs}$ with a different specific frequency $f_s = s \cdot (1/T_{obs})$, wherein s is an integer ≥1. The method further comprises periodically expanding the signal ($r_{tot}(t)$) in a Fourier series and obtaining the different complex spectral components of the periodically expanded signal ($r_{Ptot}(t)$). By way of illustration, embodiments of the present invention not being limited thereto, a number of standard and optional features will be further described below.

The algorithm can be used for position determination, although embodiments of the present invention are not limited thereto.

Based on the existing infrastructure of sources, for instance light sources as LEDs, and a minimization of the installation costs, the following signal properties are preferred in embodiments of the present invention: (1) the light emitted by each source, for instance LED, is turned on/off at a frequency above the flicker threshold, i.e. above 300 Hz, wherein the dimming is determined by a duty cycle for instance between 10 and 90% and (2) there is no synchronization between the sources, i.e. LEDs.

Figure 2:
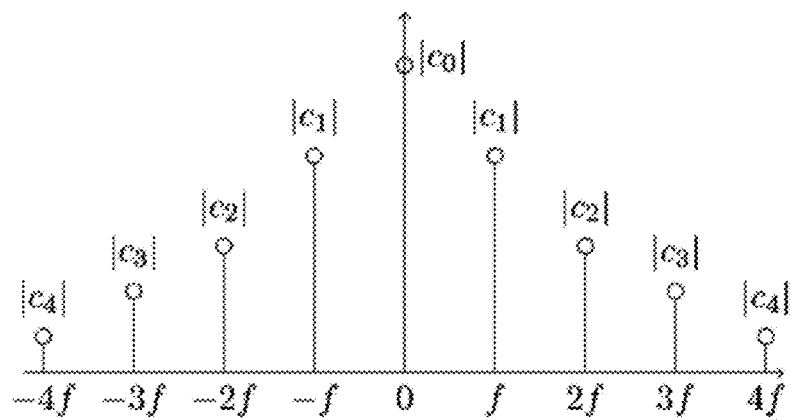
FIG. 2 illustrates an amplitude spectrum of the Fourier series expanded signal ($r_P(t)$), where the observed signal equals $r_1(t)$ as known in the art.

FIG. 1 illustrates a received signal, comprising one sub-signal i.e. from a single transmitter or intensity source during an observation time slot $T_{obs}$, wherein the signal is a block-wave signal and s=1. $\Delta$ is a time shift and depends on the instance when the receiver starts to observe the sub-signal ($r_1(t)$), while $\tau$ is the time duration of the high level signal (I) within the observation slot $T_{obs}$. When one periodically expands this signal in a Fourier series, the following equation is obtained (with $f=1/T_{obs}$ the observation frequency and $r_P(t)$ the periodically expanded signal), note that the signal itself is not periodic:

$$r_P(t) = \sum_{n=-\infty}^{n=+\infty} c_n e^{jn2\pi ft} \quad \text{(Eq. 1)}$$

with $$c_n = I\delta \frac{\sin(n\pi\delta)}{(n\pi\delta)} e^{-jn\pi(2D+\delta)} = |c_n|e^{j\phi_n} \quad \text{(Eq. 2)}$$

wherein $\delta$ is the dimensionless duty cycle, and can be written as $\tau/T_{obs}$, and the dimensionless normalized delay D can be written as $\Delta/T_{obs}$. It is best noted that, in order to be useful for communication purposes, $\delta$ must be different from 0 or 1 (for instance between 0.1 and 0.9). FIG. 2 illustrates the magnitude spectrum. One can see from Eq. 2, that the normalized delay advantageously has no impact on the magnitude spectrum $|c_n|$, while the intensity I has no impact on the phase spectrum $\Phi_n$.

Figure 3:
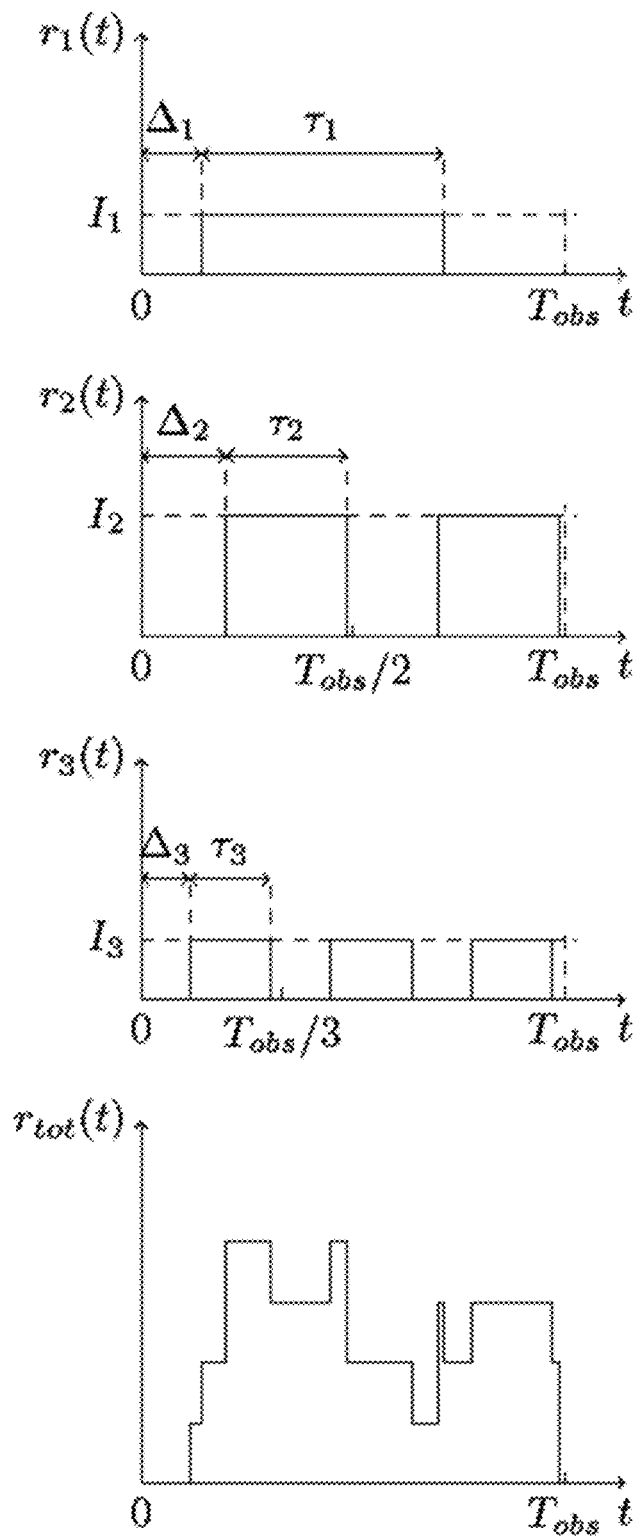
FIG. 3 illustrates a received signal $r_{tot}(t)$, which is the sum or total of the received sub-signals from three intensity sources ($r_1(t)$, $r_2(t)$, $r_3(t)$) with random time shifts $\Delta_1$, $\Delta_2$ and $\Delta_3$ (i.e. not synchronized) and equal duty cycles used in embodiments of the present invention.
Figure 4:
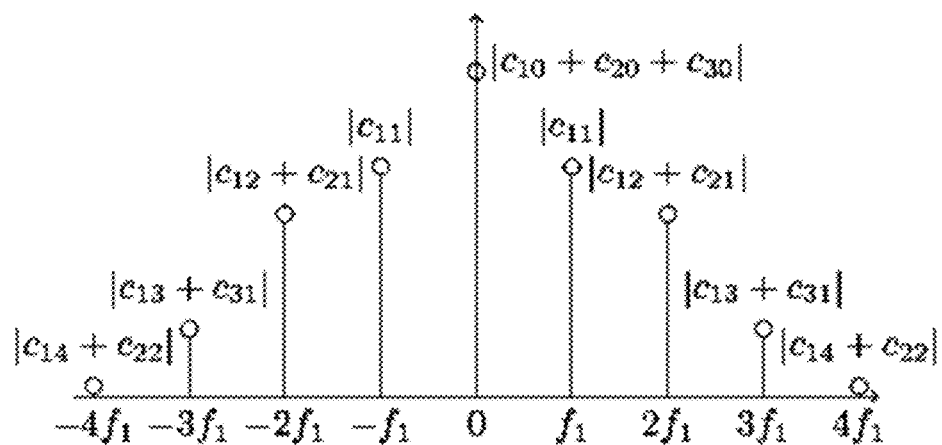
FIG. 4 illustrates an amplitude spectrum of the signal $r_{Ptot}(t)$ (being the Fourier series expansion of $r_{tot}(t)$) which is to be demultiplexed using methods according to embodiments of the present invention.

Example: Demultiplexing Method According to the Present Invention Applied for a Signal ($r_{tot}(t)$) which is a Sum of Three Intensity Sub-Signals ($r_1(t)$, $r_2(t)$ and $r_3(t)$), Provided by Three Non-Communicating Sources In specific embodiments, in order to perform an accurate position estimation of the receiving end, at least three sources should be provided, transmitting three sub-signals. In FIG. 3, three sources and their respective sub-signals are illustrated, wherein the three sources are preferably located at a different position within the premises and preferably broadcast equal intensity levels for each source. At the position of the receiver though, the received intensity levels depend on the distance from that specific source. As an illustration, one can see that the receiver is closest to source number 2, while the distance to sources 1 and 3 is equal ($I_2 > I_1 = I_3$). Unfortunately, the receiver does not observe directly the different broadcast signals, but rather the sum of these signals (indicated as $r_{tot}(t)$ in FIG. 3). The goal of a method according to at least some embodiments of the present invention is preferably to reconstruct, or demultiplex, the different received magnitude and/or phase levels or spectra for the individual sources, based on the observation of the received signal $r_{tot}(t)$ during a time slot $T_{obs}$. Once these individual complex spectra are determined, numerous solutions as known in the art exist to determine the position, for instance a maximum likelihood or least squares estimation. It is to be noted that during the observation time slot $T_{obs}$ the pattern, which is repetitive but not necessarily periodic, of each sub-signal of each source occurs once, or with a periodicity that is an integer multiple s of the observation frequency $f=1/T_{obs}$. From the example of FIG. 3, one can see that the second source has a periodicity (within $T_{obs}$) that equals two times f, while the third source has a periodicity (within $T_{obs}$) that equals three times f. Another limitation is that the sources that can be observed simultaneously, should have a different frequency multiplication factor s (as defined by Equation 5).

In this specific example, the number of sources is limited to three, but more than two, more than three, more than four, etc. or in this specific example three received sub-signals are perfectly handled by using embodiments of the present invention, without any additional modifications, resulting in a very generic and robust method. In embodiments of the present invention the observed signal $r_{tot}(t)$, which is a sum of the contributing sub-signals, is periodically expanded, leading to the following Fourier series as illustrated in the equation below (Eq. 3)):

$$r_{Ptot}(t) = \sum_{s=1}^{s=3} r_{Ps}(t) = \sum_{s=1}^{s=3} \sum_{n=-\infty}^{n=+\infty} c_{sn} e^{jn2\pi f_s t} \quad (Eq. 3)$$

with $$c_{sn} = I_s \delta_s \frac{\sin(n\pi\delta_s)}{(n\pi\delta_s)} e^{-jn\pi(2D_s + \delta_s)} \quad (Eq. 4)$$

and s being a positive integer $$f_s = sf = s\frac{1}{T_{obs}} \quad (Eq. 5)$$

If we impose that all three sub-signals have the same (this is not a limitation though but will occur often), known, duty cycle ($\delta_3 = \delta_2 = \delta_1$), one can write that:

$$c_{sn} = I_s \delta \frac{\sin(n\pi\delta)}{(n\pi\delta)} e^{-jn\pi(2D_s + \delta)} \quad (Eq. 6)$$

Until now, the only condition imposed to the frequency ($f=1/T_{obs}$) was that they were preferably above the flicker threshold in order to be compliant with the illumination functionality. As demonstrated hereafter, the determination of the individual received intensity levels is based on the expansion coefficients in the Fourier series of the received signal $r_{tot}(t)$. In the example of FIG. 3, we see that $f_1=f$, $f_2=2.f$ and $f_3=3.f$. After Fourier series expanding the incoming signal observed during $T_{obs}$, a number of coefficients are obtained at the discrete frequency components (n.f, with n integer and ≥0). At DC (thus n=0), we have:

$$c_{10} + c_{20} + c_{30} = \delta(I_1 + I_2 + I_3) \quad (Eq. 7)$$

It is clear that this is not sufficient to separate $I_1$, $I_2$ and $I_3$. At f, the only possible contribution can come from the first source:

$$c_{11} = I_1 \delta \frac{\sin(\pi\delta)}{(\pi\delta)} e^{-j\pi(2D_1 + \delta)} = |c_{11}| e^{j\phi_{11}} \quad (Eq. 8)$$

This leads immediately to the value of $I_1$:

$$I_1 = \frac{\pi |c_{11}|}{\sin(\pi\delta)} \quad (Eq. 9)$$

and the value of the unknown, random delay $D_1$:

$$D_1 = -\frac{1}{2}\left(\frac{\phi_{11}}{\pi} + \delta\right) \quad (Eq. 10)$$

These two values lead to the knowledge of all other complex cm-coefficients, based on the relationship as illustrated in Eq. 6. At frequency 2.f, the only possible contributions we find are the complex sum of the first harmonic of the second source (wherein the assigned frequency $f_2$ is an integer multiple off, namely 2.f) and the second harmonic of the first source. Since we know every $c_{1n}$, $I_2$ and $D_2$ are easily obtained by subtraction, which leads to knowledge of all $c_{2n}$ coefficients. At 3.f finally, we find $c_{13} \pm c_{31}$. The same procedure leads to retrieval of $I_3$ and $D_3$.

The present invention provides in embodiments a method comprising the following steps: The sources, i.e. LEDs, each comprising a sub-signal have each been assigned a frequency $f_s$, that equals an integer (s) times the inverse of the observation time slot $T_{obs}$. The receiver that wants to know its coordinates or position in the indoor premises, takes a sample of the received signal $r_{tot}(t)$ during this amount of time $T_{obs}$. This time signal $r_{tot}(t)$ is used as a periodic representation of a signal $r_{Ptot}(t)$, with different complex spectral components. The determination of the different intensity levels starts from the lowest frequency components towards increased frequencies. If at f, a value is found, this means that a LED transmitting the lowest frequency is within the observation space of the receiver and all the higher harmonic coefficients are easily found using Eq. (9), (10) and (4). If no value is found at that frequency, this means that the LED transmitting a sub-signal with the lowest frequency is not present in the received signal $r_{tot}(t)$. The next frequency to be considered is 2.f. The contribution from the LED transmitting at this frequency is easily determined since one knows all the harmonic components of the observation frequency f. At any frequency, the first order harmonic transmitted by a certain LED can be found due to the observation that it is the complex sum of one unknown (that first order harmonic) and the known higher order harmonics of lower frequency assigned LEDs. Based on this reasoning, the intensity levels $I_s$ and delays $D_s$ of all contributing sources (i.e. sub-signals) can be retrieved. When observations during consecutive time slots $T_{obs}$ are executed, methods of the present invention can be used to demultiplex non-synchronized data streams based on e.g., differential pulse position modulation.

In one aspect, the present invention also relates to a demultiplexing device for demultiplexing a signal ($r_{tot}(t)$). The demultiplexing device according to embodiments of the present invention is adapted for demultiplexing the signal in at least two sub-signals (($r_1(t)$, $r_2(t)$, ...) using a method as described in the first aspect. It is to be noticed that the different sub-signals, typically stemming from different contributing sources, e.g. different LEDs, do not need to be synchronized in order to be able to demultiplex the signal. Further features of the demultiplexing device may be components providing the functionality of one or more optional method steps as described above.

In a further aspect, the present invention also relates to a method for determining a position of an object based on visible light from different light sources. The method comprises detecting, on the object for which a position is to be determined, a signal representative for the different contributions of the different light sources, demultiplexing the signal using a method as described in the first aspect for obtaining the different contributions of the different radiation sources, and deriving, based on the determined different contributions of the different radiation sources, a position of the object. The step of deriving a position based on the determined different contributions of the different radiation sources may for example be based on trilateration, although embodiments of the present invention are not limited thereto (an alternative is based on fingerprinting, where relative signal strengths can be used, taking e.g., LED aging into account).

In yet a further aspect, the present invention also relates to a position determining system for determining a position of an object based on visible light from different light sources. Such a system also may be referred to as a visible light positioning system. The position determining system comprises a demultiplexing device for demultiplexing a signal according to an aspect as described above. The position determining system furthermore comprises a position deriving means for deriving a position based on the determined different contributions of the different radiation sources as obtained from the demultiplexing system. The demultiplexing device and/or the position deriving means may be implemented as software based components on a processor. Advantages of the system may be as set out in the corresponding demultiplexing device or the corresponding methods. Further optional components will now be described. It is to be noticed that, according to some embodiments, the different light sources also may be part of the position determining system. Alternatively the position determining system is co-operating with different light sources, but the light sources are not part of the position determining system. The different radiation sources provide different sub-signals showing a different repetitive pattern. A plurality of the signals show a periodicity with a different specific frequency $f_s = s \cdot (1/T_{obs})$, wherein s is an integer ≥1. It is to be noticed that the frequencies used for the visual light positioning system may be different for all radiation sources used, but that for embodiments of the present invention, it is sufficient that the frequencies used are different for those radiation sources that can contribute to the signal used for detection. For example, in a building having multiple levels, light sources positioned at different levels may have the same frequency, as long as the radiation sources can be identified based on that frequency. The position determining system also may comprise a light source driver for driving the different light sources at specific frequencies. The position determining system also may comprise the detector used for detecting the complex signal i.e. the detector may be part of this system, rather than the system only having an input for receiving such a complex system. The detector may be a single detector, such as for example a photodiode.

In still another aspect, the present invention relates to a computer program product for, when executing on a computing device, executing the method for demultiplexing a signal ($r_{tot}(t)$) as described in the method according to the above aspects. The present invention also relates to a computer-readable data carrier storing a computer program product according to this further aspect, and to the transmission of such computer program product over a communication network. The present invention thus also includes a computer program product, which provides the functionality of any of the data processing steps of the methods according to the present invention when executed on a computing device. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

It is to be understood that this invention is not limited to the particular features of the means and/or the process steps of the methods described as such means and methods may vary. It is also to be understood that the terminology used herein is for purposes of describing particular embodiments only, and is not intended to be limiting. It must be noted that, as used in the specification and the appended claims, the singular forms "a" "an" and "the" include singular and/or plural referents unless the context clearly dictates otherwise. It is also to be understood that plural forms include singular and/or plural referents unless the context clearly dictates otherwise. It is moreover to be understood that, in case parameter ranges are given which are delimited by numeric values, the ranges are deemed to include these limitation values.

EXAMPLE

By way of illustration, embodiments of the present invention not being limited thereto, a theoretical discussion as well as a practical example of a method and system according to an embodiment of the present invention is discussed below. It is to be noticed that the example given below is only one example of an embodiment of the present invention illustrating a possible implementation, but that embodiments of the present invention are not restricted thereto. It further is to be noticed that the symbols used in the equations given for illustrating the example below, do not necessarily have the same meaning as the symbols used in the equations shown when describing the detailed embodiments indicated above. The equations in the description below therefore should be seen as a separate set of equations.

In the example, a technique is proposed that uses square waves and a Frequency division multiple access (FDMA) scheme to build a solution where only the current lighting needs to be replaced with intelligent light fixtures which have limited logic and bandwidth. As multiple access technique, the properties of square waves in the frequency domain are used. The receiver can determine its position by performing a Fast Fourier Transform (FFT) on the received data and using the information from the light fixtures and a pre-downloaded map.

As will be described below, it was found that square waves can be applied in a VLP system where FDMA is used to retrieve the signals from the different LEDs. Due to the properties of square waves in the frequency domain, an FDMA solution was realized by selecting a single ground frequency (above the flicker threshold) for the first LED and where the neighboring LEDs can take a frequency which is a multiple of this ground frequency chosen at an unoccupied frequency component. Due to fact that the LEDs remain unsynchronized, this VLP system was easy to implement and if the ground frequency is chosen above the flicker threshold, the bandwidth requirements at the transmitter side can be kept low making it possible to use a microcontroller. Simulations across the entire test bench surface showed that the position error became large due to the chosen photodiode with a FOV of 70°. When a photodiode with a FOV of 90° is used, the position error drops to a few centimeters.

The system of the present example was designed as described below. The properties of the square waves are discussed below.

Figure 5:
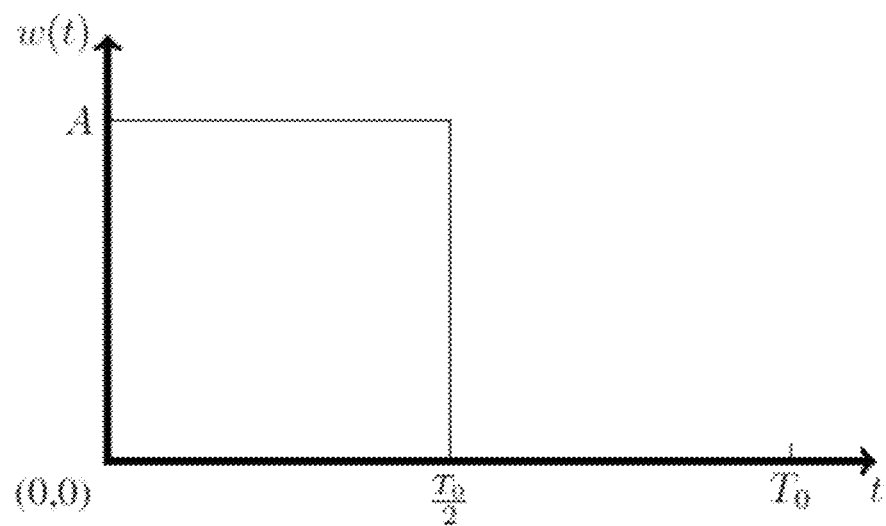
FIG. 5 illustrates a square wave as can be used in embodiments according to the present invention.

The visible light communication (VLC) system of the present example was an Intensity Modulation—Direct Detection (IMDD) communication system. For easy implementation of a Visible Light Positioning (VLP) system, signals from different LEDs needed to be received simultaneous where the system has to be low cost (no backbone network). When Frequency division multiple access (FDMA) was used with square waves, as in the present example, this system was easily realized in current lighting applications with low bandwidth requirements for the LED. Multiple access was achieved by the properties of square waves in the frequency domain. The square wave from FIG. 5 could be represented in the time domain by $$w(t) = A \prod \left( \frac{t - \frac{T_0}{2}}{T_0} \right)$$ (Eq. 11)

When the square wave was periodically repeated, the complex Fourier coefficients were found by $$c_n = \frac{A}{2} e^{-j\frac{\pi}{2}n} \mathrm{sinc}\left(\frac{n\pi}{2}\right)$$ (Eq. 12)

Figure 6:
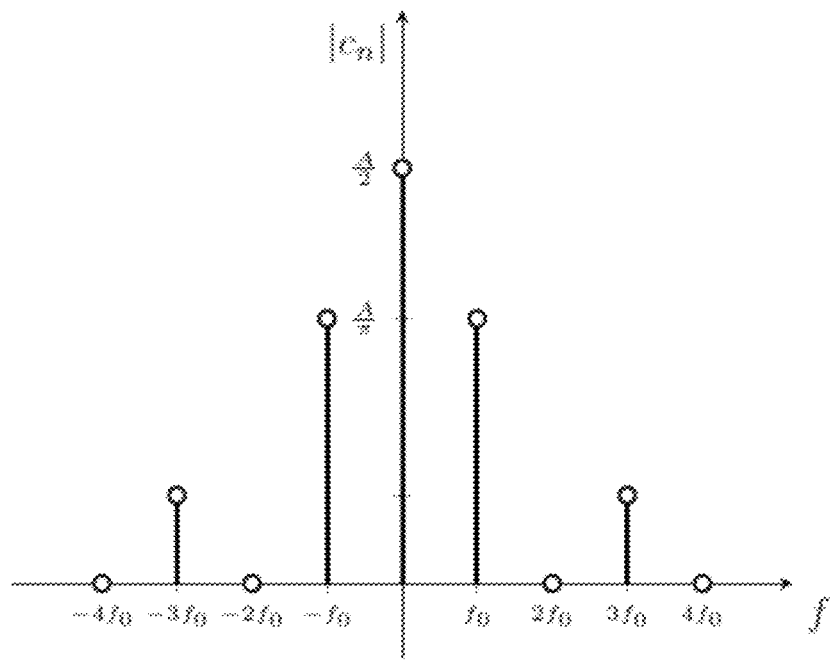
FIG. 6 illustrates spectral coefficients of a square wave, as can be used in embodiments of the present invention.
Figure 7:
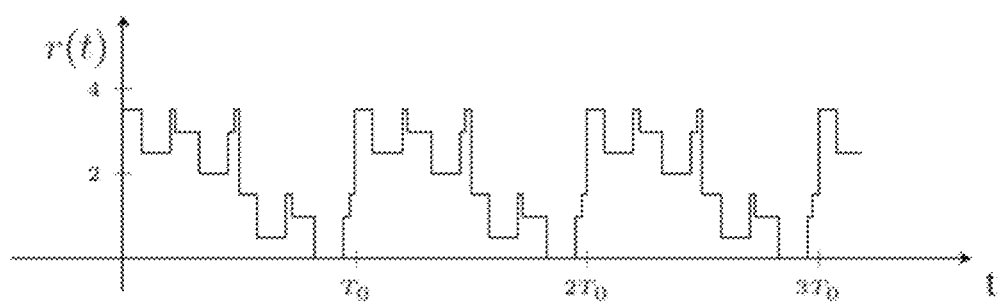
FIG. 7 illustrates a signal at the receiver when three LEDs send information asynchronously, as used in an example according to an embodiment of the present invention.

It is clear from Eq. 12 that for n even (and n≠0) that |$c_n$|=0. From these components, the power spectrum was found as shown in FIG. 6. All even components were zero which leaved the possibility to choose the frequencies of the other LEDs at one of the even components of the ground frequency. When the first LEDs used the ground frequency $f_0$, the neighboring LEDs were chosen frequencies $2f_0$, $4f_0$, $8f_0$, etc. The received signal was a superposition of all signals transmitted by the LEDs which were in the receivers Field Of View (FOV). FIG. 7 shows a time wave form of the signal as a superposition at the receiver side of three transmitted intensity levels. The receiver performed an FFT on the received signals and the Received Signal Strength (RSS) values for every LED were found by evaluating the first coefficient (c1) of every possible frequency. Remark that each LED was simply broadcasting the same sequence at its dedicated frequency. The information that reached the receiver was an intensity at a frequency. Mapping of the frequencies at a LED location with a known RSS leaded to the needed input of the localization algorithm.

Figure 8:
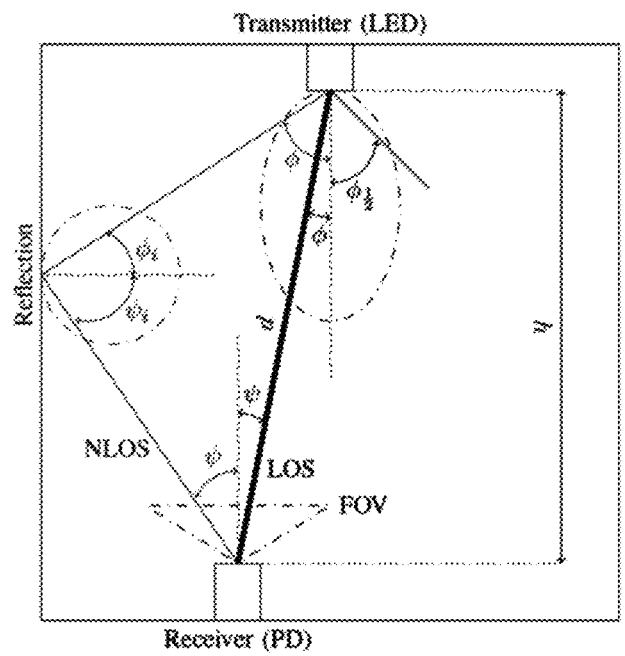
FIG. 8 illustrates an overview of a visible light communication (VLC) link, as used in an example according to an embodiment of the present invention.
Figure 9:
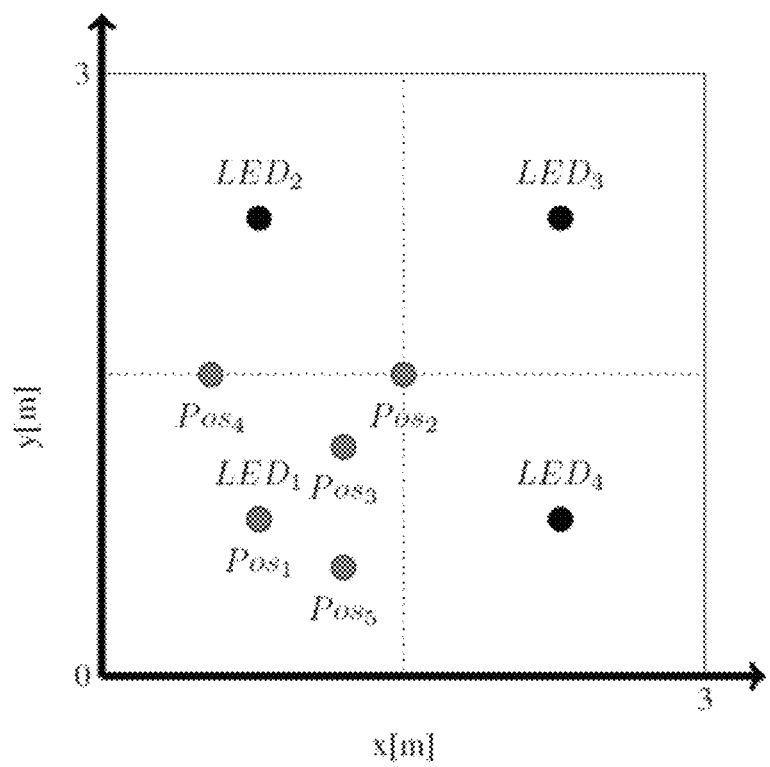
FIG. 9 illustrates a test bench for the evaluation of a Visible Light Positioning (VLP) system, as used in an example according to an embodiment of the present invention.

Below, the Visible Light Positioning is described. The receiver received the RSS from the FFT which was used by the positioning algorithm. The RSS ($P_R$) is a function of the channel response (H(0)) and the transmitted optical power ($P_T$) (Eq. (13)). The channel response is determined by the transmitter, receiver and room (FIG. 8). The optical power of the LED was emitted according to its spectral response and following a specific radiation pattern ($R_E(\phi)$). The light travels in a direct path (LOS) to the photodiode (PD). The PD transforms the optical signal back to an electrical signal. The generated electrical signal depends on the Active Area ($A_R$), the spectral response and the incoming angle of the light ($\psi$). The receiver can have a lens (optical concentrator) (G($\psi$)) or optical filter (T($\psi$)) to restrict or extent the signals that can be received. An important characteristic of the receiver is the FOV, which gives the maximum angle to detect signals. For indoor positioning, low data rates are sufficient, where the channel response reduces to the LOS component (H(0)) (Eq. (14)).

$$P_R = P_T H(0)$$ (Eq. 13)

$$P_R = \frac{P_T}{d^2} R_E(\phi) T(\psi) G(\psi) A_R \cos(\psi)$$ (Eq. 14)

In the simulations and practical tests, trilateration was used as positioning algorithm where the distances between the individual LEDs and the receiver were the unknowns. The distance was found from the channel impulse response (Eq. (14)) but this required the knowledge of the radiation angle ($\phi$) and incidence angle ($\psi$), which were both unknown in a real system. For the practical tests, the BXRA-56C26001 LED and BPX612 photodiode were used for the evaluation of the system. The LED had a first order Lambertian radiation pattern $R_E(\phi)$ while the receiver did not have a lens (G($\psi$)) or optical filter (T($\psi$)) making it a bare detector. Due to the casing of the photodiode, the FOV was restricted to 70° which compromised the performance at large incoming angles. With the use of these components, the channel response reduced to Eq. 15. By use of geometry, the distance d could be found by Eq. (16 when the height h between the LED and receiver was known and fixed.

$$P_R = \frac{P_T}{d^2} \frac{\cos(\phi)}{\pi} A_R \cos(\psi)$$ (Eq. 15)

$$d = \sqrt[4]{\frac{P_T}{P_R} \frac{h^2}{\pi} A_R}$$ (Eq. 16)

In this model reflections were not taken into account. For these low data rates of the proposed system, Inter Symbol Interference (ISI) will not influence the system performance because the channel delay was in the order of several 10 ns. Because the received optical power was used by the positioning algorithm, this could have an influence on the position error. Results showed that the reflected power depends on the room size and materials where the influence was limited for normal sized rooms (larger than 3 by 3 by 2.5 m). Only at the room walls the ratio between the power of the LOS component and reflection became smaller and could introduce errors in the position algorithm.

The positioning system was evaluated.

First evaluation was performed using a test bench.

For the experimental evaluation of the simulations, a test bench was developed in a lab environment, of which the parameters can be found in Table I. The test bench is a table desk of 3 by 3 meters where

TABLE 1 parameters of the test bench

| Parameter | Value |
|---|---|
| Room dimensions (L × B × H) [m] | (3 × 3 × 2.5) |
| LED power [lm] | 2600 |
| Position of the LEDs (x, y, z) [m] | (0.75 × 0.75 × 2.25) |
| | (2.25 × 0.75 × 2.25) |
| | (2.25 × 2.25 × 2.25) |
| | (0.75 × 2.25 × 2.25) |
| Receiver height [m] | 1.03 |
| FOV [°] | 70 |
| $A_R$ [mm$^2$] | 7 |

TABLE 1-continued parameters of the test bench

| Parameter | Value |
|---|---|
| Position of the recevier (x, y, z) [m] | (0.75 × 0.75 × 1.03) |
| | (1.5 × 1.5 × 1.03) |
| | (1.25 × 1 × 1.03) |
| | (0.5 × 1.5 × 1.03) |
| | (1.25 × 0.4 × 1.03) | four off-the-shelf LEDs (BXRA-56C2600) are evenly distributed across the surface. With this layout, the desk is illuminated according to the standard (500 lux) when there is no communication. The receiver is placed flat on the desk which results in a constant height h of 1.22 m between the LEDs and the receiver. In this environment, five representative positions were chosen to perform measurements and simulations. For every position the 2D-position ($x_e$ and $y_e$) is estimated and the position error is calculated according to Eq. 17 (x and y are the exact position).

$$\text{error} = \sqrt{(x-x_e)^2 + (y-y_e)^2} \quad \text{(EQ. 17)}$$

For practical implementation the bandwidth at the transmitter and receiver side should be as low as possible. This will allow to use the Pulse Width Modulation (PWM) input of current high efficiency LED drivers for modulating the light stream. The first LED was assigned a ground frequency of f0 of 300 Hz which is sufficient to overcome the flicker problem. For the exemplary setup with four LEDs, this was obtained with an electrical and optical bandwidth of 2.4 kHz (8f0) at the transmitter side. The receiver bandwidth was determined by the FFT-size (the number of frequency bins that will be created) where a higher FFT-size requires a higher sample rate. The influence of the FFT-size was changed to see how it affects the position error.

To perform the simulations, all parameters of the test bench (Table I) were included in a Matlab model. For every position chosen in the test environment, 103 simulations were performed where for every run, different random time offsets were chosen between the transmitted signals (simulating the non-synchronized system). The simulations did not take into account other noise sources to evaluate the influence of the FFT-size on the position error. The positioning system used trilateration where the position of the mobile node was found by taking a least square fit. The measurements used the same data as the simulations namely the same time delays between the transmitted signals. The LEDs were driven by Matlab with the NI USB-6212 data acquisition card so there is no clock jitter between the different sources (FIG. 6). The difference with the simulations was that other noise sources are present in the system (namely the shot noise caused by the surrounding light and terminal noise by the receiver). The signal was sampled by the NI USB-6212 4 at the same sampling rate as in the simulations. The data was further processed using Matlab and the same positioning algorithm is used. In a second measurement, the LEDs were driven by non-synchronized Arduino microcontrollers. This introduced random delays between the signals and clock jitter. The received signal was still sampled by the NI USB-6212 where further processing was performed within the Matlab environment.

Table II gives the P95 value of the error for every position for the simulations and measurements. The results are given for a maximum sample rate at the receiver of 20 kSps and 100 kSps which corresponds to an FFT-size of 64 and 256 respectively. The simulations show that the FFT-size does not influence the position error in the absence of other noise sources. From the measurements, one can see that the position error will mostly be determined by the other noise source like shot noise and terminal noise. With these noise sources present, the FFT-size becomes more important to reduce the position error. With an FFT-size of 256, the P95 of the position error is lower than 10 cm. When the Arduino is used at the transmitter side, the error is in the same order indicating that the additional clock jitter introduced by the Arduino boards, does not affect the system performance.

Figure 10:
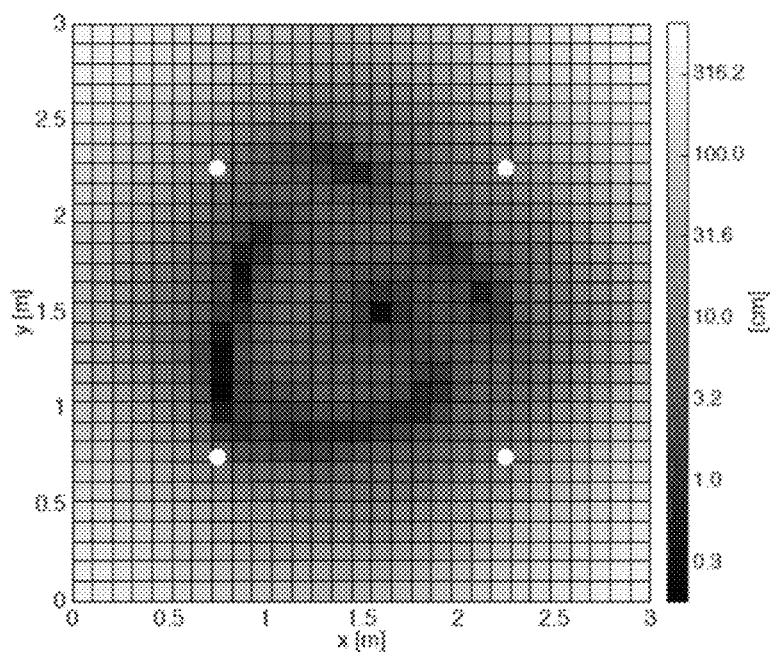
FIGS. 10 and 13 illustrate the 95$^{th}$ percentile (P95) value of the error over the entire surface for determining position with different sampling, different data processing and different field of view, as obtained in an example according to an embodiment of the present invention.
Figure 11:
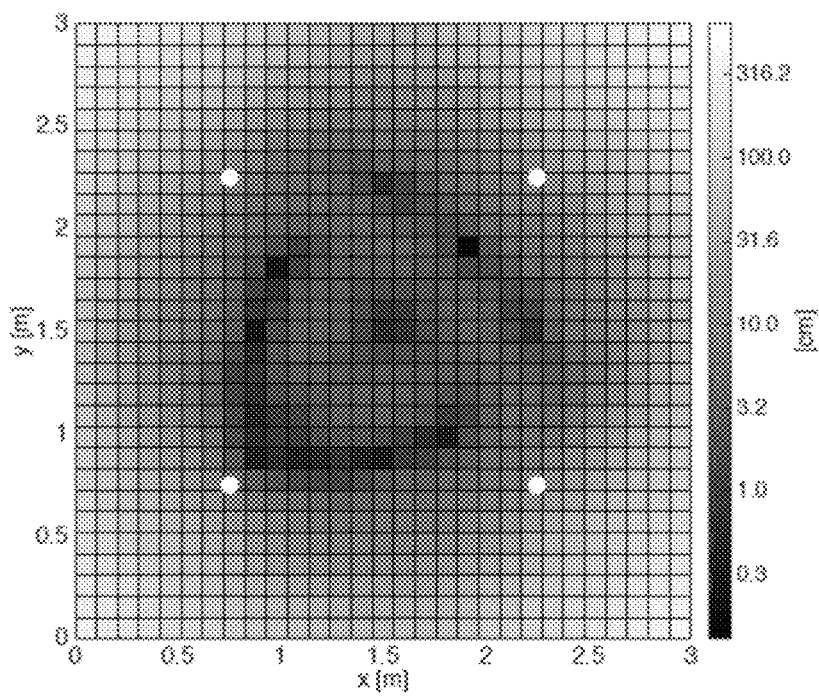
Figure 12:
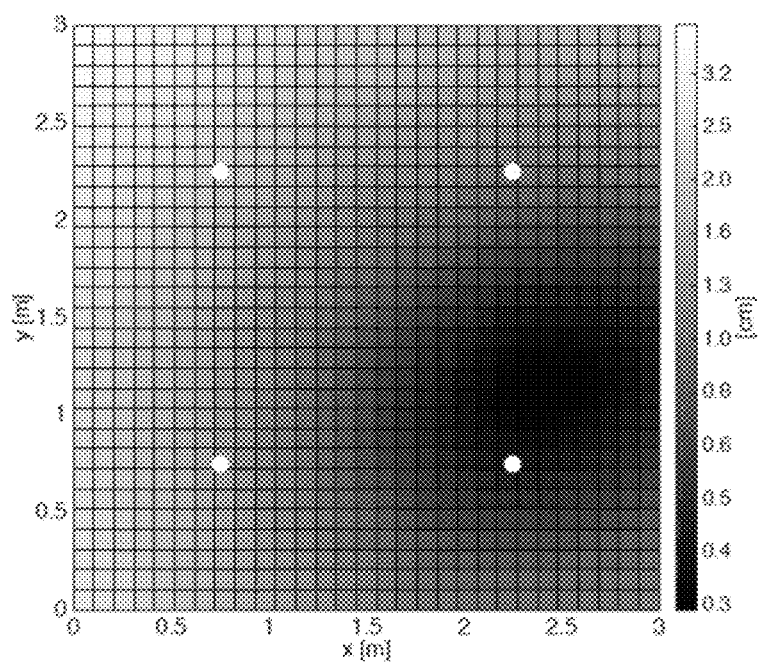
Figure 13:
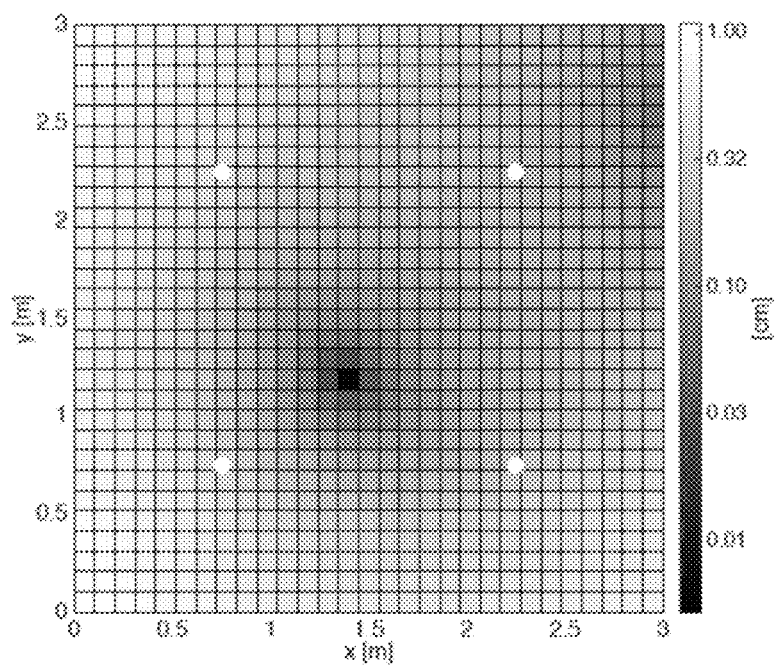

As described above, the BPX61 photodiode was used in the simulations and measurements, but this photodiode has a FOV of 70°. This could cause position errors when signals are received at large incoming angles ($\psi$). FIGS. 10 and 11 show the simulation results for the P95 of the positioning error over the entire surface when the BPX61 is used. FIG. 10 shows the results for a sample rate of 19.2 kSps and an FFT-size of 64. FIG. 11 illustrates the situation for a sample rate of 76.8 kSps and an FFT size of 256. The plot shows that the error increases rapidly in the corners of the room due to the limited FOV. When the simulations are repeated with the PDA10A5 receiver which has a FOV of 90°, the results are show in FIG. 12 and FIG. 13 (further having respectively the same settings as FIG. 10 and FIG. 11). With this receiver, the position can be reduced to several centimeters over the entire surface.

TABLE 2 overview P95 errors in position for simulation and measurement

| | P95 [cm] | | |
|---|---|---|---|
| Position | Simulation | Measurements | Measurements using Arduino |
| Sample Rate = 19.2 kSps and FFT-size = 64 | | | |
| 1 | 2.7938 | 34.355 | 19.898 |
| 2 | 0.87909 | 12.58 | 7.9155 |
| 3 | 3.2277 | 13.785 | 9.4011 |
| 4 | 5.6452 | 26.795 | 20.789 |
| 5 | 9.6868 | 37.221 | 18.21 |
| Sample Rate = 76.8 kSps and FFT-size = 256 | | | |
| 1 | 3.2576 | 8.5631 | 13.471 |
| 2 | 0.16561 | 7.1782 | 5.1917 |
| 3 | 3.1759 | 4.9367 | 9.2031 |
| 4 | 7.3233 | 9.4179 | 15.02 |
| 5 | 9.6266 | 8.4089 | 11.07 |

The invention claimed is:

1. A method for determining a position of an object based on visible light from different light sources, the method comprising:

detecting, on the object for which a position is to be determined, a signal ($r_{tot}(t)$) representative of different contributions of the different light sources;

demultiplexing the signal ($r_{tot}(t)$) to obtain the different contributions of the different radiation sources, said demultiplexing including receiving said signal ($r_{tot}(t)$) as a sum of at least two sub-signals ($r_1(t), r_2(t), \ldots$), wherein each of said at least two sub-signals comprises a different repetitive pattern, sampling the signal ($r_{tot}(t)$) during a time period ($T_{obs}$), wherein the time period ($T_{obs}$) is such that the different repetitive patterns of each sub-signal occur at least once and wherein at least two sub-signals are periodic, each with a different frequency being an integer multiple of or equal to an observation frequency $f_s=1/T_{obs}$ being the inverse of the time period $(T_{obs})$, and periodically expanding the sampled signal $(r_{tot}(t))$ in a Fourier series and obtaining different complex spectral components of a periodically expanded signal $(r_{Ptot}(t))$; and deriving, based on the determined different contributions of the different radiation sources, a position of the object.

2. The method according to claim 1, wherein in demultiplexing said signal $(r_{tot}(t))$, wherein when said signal $(r_{tot}(t))$ is received at a receiving end, and said signal $(r_{tot}(t))$ comprises at least three sub-signals provided by at least three sources, the method further comprises determining the position of the receiving end based on the different complex spectral components of the received signal.

3. The method according to claim 1, wherein at least one of said sub-signals is a rectangular shaped signal.

4. The method according to claim 1, wherein said at least two sub-signals are provided by at least two non-communicating and non-synchronized sources.

5. The method according to claim 1, wherein the phase delay of the at least two sub-signals is random.

6. A position determining system for determining a position of an object based on visible light from different light sources, the system comprising:

a demultiplexing device for demultiplexing a signal $(r_{tot}(t))$ representative of different contributions of the different light sources detected from an object for which a position is to be determined, said demultiplexing device including a receiver adapted to receive the signal $(r_{tot}(t))$, wherein said signal $(r_{tot}(t))$ is a sum of at least two sub-signals $(r_1(t), r_2(t), \ldots)$, and wherein each of said at least sub-signals comprises a different repetitive pattern;

a demultiplexer adapted to demultiplex the signal $(r_{tot}(t))$ in the at least two sub-signals $(r_1(t), r_2(t), \ldots)$ by receiving said signal $(r_{tot}(t))$ as the sum of the at least two sub-signals $(r_1(t), r_2(t), \ldots)$, sampling the signal $(r_{tot}(t))$ during a time period $(T_{obs})$, wherein the time period $(T_{obs})$ is such that the different repetitive patterns of each sub-signal occur at least once and wherein at least two sub-signals are periodic, each with a different frequency being an integer multiple of or equal to an observation frequency $f=1/T_{obs}$ being the inverse of the time period $(T_{obs})$, and periodically expanding the sampled signal $(r_{tot}(t))$ in a Fourier series and obtaining different complex spectral components of a periodically expanded signal $(r_{Ptot}(t))$; and a position deriver that derives a position based on the determined different contributions of the different radiation sources as obtained from the demultiplexing device.

7. A position determining system according to claim 6, the position determining system comprising a light source driver for driving the different light sources each at a specific predetermined frequency.

8. A position determining system according to claim 7, the positioning system furthermore comprising a plurality of different light sources being driven by the light source driver.

9. The position determining system according to claim 6, wherein the demultiplexer includes a processor programmed for performing steps of a demultiplexing method including receiving said signal $(r_{tot}(t))$ as a sum of at least two sub-signals $(r_1(t), r_2(t), \ldots)$, wherein each of said at least sub-signals comprises a different repetitive pattern, sampling the signal $(r_{tot}(t))$ during a time period $(T_{obs})$, wherein the time period $(T_{obs})$ is such that the different repetitive patterns of each sub-signal occur at least once and wherein at least two sub-signals are periodic, each with a different frequency being an integer multiple of or equal to an observation frequency $f_s=1/T_{obs}$ being the inverse of the time period $(T_{obs})$, and periodically expanding the sampled signal $(r_{tot}(t))$ in a Fourier series and obtaining different complex spectral components of a periodically expanded signal $(r_{Ptot}(t))$.

10. The position determining system according to claim 6, further comprising a detector that detects, for the object for which the position is to be determined, the signal $(r_{tot}(t))$ representative of the different contributions of the different light sources.

11. One or more computer-readable non-transitory media having stored thereon executable instructions that when executed by the one or more processors configure a computer system to perform at least the following to determine a position of an object based on visible light from different light sources:

receive a signal $(r_{tot}(t))$, detected from the object for which a position is to be determined, the signal $(r_{tot}(t))$ being representative of different contributions of the different light sources;

demultiplex the signal $(r_{tot}(t))$ to obtain the different contributions of the different radiation sources, said demultiplexing including receive said signal $(r_{tot}(t))$ as a sum of at least two sub-signals $(r_1(t), r_2(t), \ldots)$, wherein each sub-signal comprises a different repetitive pattern, sample the signal $(r_{tot}(t))$ during a time period $(T_{obs})$, wherein the time period $(T_{obs})$ is such that the different repetitive patterns of each sub-signal occur at least once and wherein at least two sub-signals are periodic, each with a different specific frequency $f=1/T_{obs}$ being the inverse of the time period $(T_{obs})$, and periodically expand the sampled signal $(r_{tot}(t))$ in a Fourier series and obtain different complex spectral components of a periodically expanded signal $(r_{Ptot}(t))$; and derive, based on the determined different contributions of the different radiation sources, a position of the object.

* * * * *